Aug. 19, 1958  F. W. SAMPSON ET AL  2,847,695
WINDSHIELD WIPER ARM
Filed July 16, 1954

INVENTORS,
Frederick W. Sampson
BY & Stanley R. Carson
Craig V. Morton
THEIR ATTORNEY

United States Patent Office 2,847,695
Patented Aug. 19, 1958

2,847,695

WINDSHIELD WIPER ARM

Frederick W. Sampson and Stanley R. Carson, Dayton, Ohio, assignors to General Motors Corporation, Detroit, Mich., a corporation of Delaware Application July 16, 1954, Serial No. 443,878

10 Claims. (Cl. 15—255)

This invention pertains to windshield wiper arms, and particularly to the construction and arrangement of the resilient means employed for urging the outer section of the arm towards the windshield.

In the past, wiper arms have been designed for outward pivotal movement from an operative, or wiping, position to an inoperative, or parking, position, so as to permit manual cleaning of the windshield. Moreover, conventional wiper arms employ a coil spring for applying wiping pressure to the arm in its operative position. Furthermore, prior wiper arms have included means for latching the socket portions thereof to the spindle of a driving shaft. However, prior wiper arms have not utilized common resilient means for latching and applying wiping pressure. Accordingly, among our objects are the provision of a wiper arm including means for detachably connecting the socket portion thereof to a spindle; the further provision of a wiper arm including shaft engaging and wiper carrying sections which are pivotally interconnected whereby the wiper carrying section may be readily moved between operative and inoperative positions; and the still further provision of a wiper arm including common resilient means for latching the shaft engaging section to a spindle and for applying pressure to the wiper carrying section.

The aforementioned and other objects are accomplished in the present invention by incorporating a bearing support for the pressure applying resilient means that is constituted by a portion of the latch for locking the arm to an actuating shaft. Specifically, the improved wiper arm comprises a socket, or shaft engaging, section having the usual longitudinal serrations which are adapted to mate with like serrations formed on a spindle attached to the actuating shaft so as to establish a driving connection therebetween. The wiper carrying section and the socket section are pivotally interconnected, the connection therebetween including means for limiting outward movement of the wiper carrying section.

One end of the dual purpose resilient means, or coil spring, is connected to the wiper carrying section, while the other end thereof is connected to a lug member having a pair of transversely extending ears which constitute the bearing means for the spring. The ears are received in a pair of slots of a channel shaped latch member, which is pivotally connected to the socket section, the latch member having a tang portion arranged to be received below the spindle section of the actuating shaft so as to lock the spindle and arm together. By reason of this arrangement, the coil spring is employed to apply wiping pressure, as well as for rendering the latching means operative. The wiper arm and shaft may be readily disconnected by depressing the latch so as to displace the tang, and, thereafter, removing the wiper arm from the spindle in the usual manner.

Further objects and advantages of the present invention will be apparent from the following description, reference being had to the accompanying drawing wherein a preferred embodiment of the present invention is clearly shown.

Figure 1:
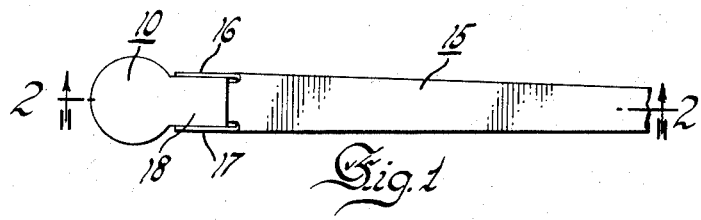
Fig. 1 is a fragmentary top view of a wiper arm embodying the present invention.

With reference to the drawing, the windshield wiper arm embodying the present invention includes an inner portion, or socket engaging section, 10, the interior of which is formed with longitudinally extending serrations 11, which are adapted to mate with like serrations 12 formed on a spindle 13, carried by an actuating shaft 14. The wiper arm also includes an outer wiper carrying section 15, generally of channel shape cross section and including a pair of longitudinally extending flanges 16 and 17, which are disposed in contiguous relation to a radial extension 18 of the socket section 10. The radial extension 18 of the socket section 10 is of channel shape and includes a pair of side flanges 19 and 20, the inner and outer sections 10 and 15 being pivotally interconnected by a pin, or rivet 21, which is integral with the inner section 10, and is attached to the side flanges 19 and 20 of the radial extension 18. The pin 21 constitutes a bearing for the outer section 15.

Figure 5:
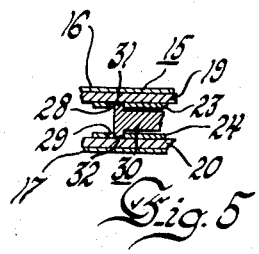
Fig. 5 is a fragmentary sectional view taken along line 5—5 of Fig. 2.

The extremities, or flanges, 19 and 20 of the radial extension 18 are preferably disposed within the confines of the outer section 15, as shown in Fig. 5. The side flanges 19 and 20 of the radial extension also support a pivot, or pin, 22, which extends through the sidewalls 23 and 24 of a channel shaped latch member 25. The latch member 25 includes an extending tang portion 26, which is arranged to project through a slot 27 in the socket section 10 so that the end portion of the tang 26 is disposed beneath the spindle 13. Thus, the latch member 25 constitutes locking means for attaching the wiper arm to the shaft spindle.

The sidewalls 23 and 24 of the latch member 25 are formed with aligned slots 28 and 29, respectively, which constitute the bearing support for a lug 30. As shown particularly in Fig. 5, the lug 30 is formed with a pair of transversely extending ears 31 and 32, which are received in the bearing slots 28 and 29 of the latch member 25. The other end of the lug member 30 is formed with an opening 33 to which one end of a coil spring 34 is attached. The other end of the coil spring 34 is attached to a tang 35 located in an intermediate portion of the outer section 15.

Figure 2:
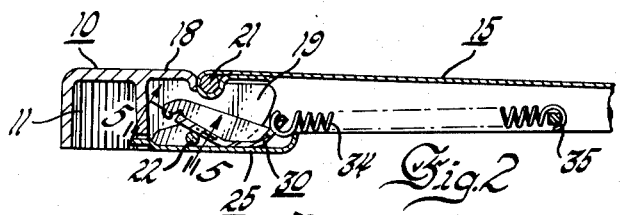
Fig. 2 is a sectional view taken along line 2—2 of Fig. 1.
Figure 3:
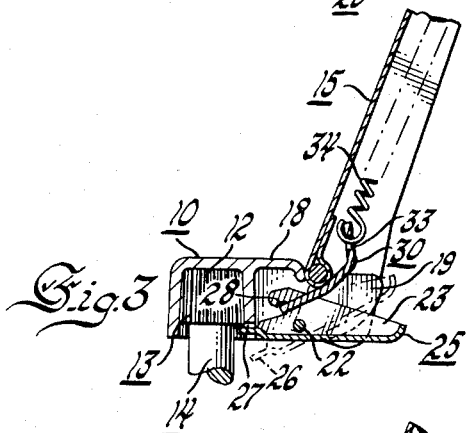
Fig. 3 is a sectional view similar to Fig. 2, depicting the arm in the inoperative position.

The outer section 15 of the arm may be swung from its normal operating position, as illustrated in Fig. 2, to an inoperative, or parked, position, as illustrated in Fig. 3, by reason of the pivotal interconnection between the inner and outer sections. Any suitable means may be employed for limiting outward movement of the outer section 15 to a parking position, but, as illustrated, the sidewalls 16 and 17 of the outer section are arranged to abut the radial extension 18 when the outer section and inner sections are in the relative positions depicted in Fig. 3.

Figure 4:
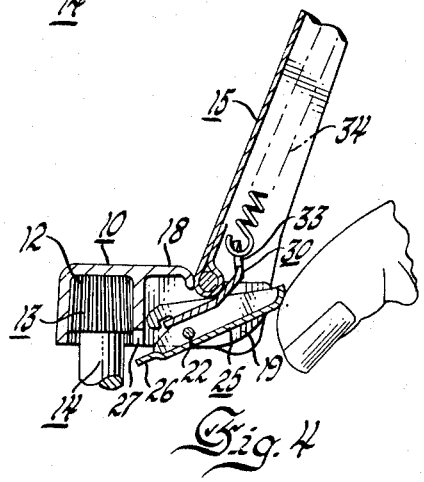
Fig. 4 is a sectional view similar to Fig. 3 depicting the manner in which the locking means are released.

The resilient means, or coil spring, 34 performs a dual function in the instant wiper arm. In the conventional manner, the coil spring applies wiping pressure to the outer arm section 15. In addition, by reason of the bearing support for the spring 34 being carried by the latch member 25, the spring 34 also functions to maintain the latch 25 in a locking position. Thus, as depicted in Fig. 4, the locking tang 26 may be moved to an inoperative position by the application of pressure to the outer end of the latch member 25, so as to pivot the latch member 25 about the pin 22, thereby removing the tang 26 from the slot 27. However, in so moving the latch 25, the spring 34 is stretched, and, consequently, the spring 34 will normally maintain the locking means operative.

While the embodiment of the present invention as herein disclosed, constitutes a preferred form, it is to be understood that other forms might be adopted.

What is claimed is as follows:

1. A windshield wiper arm comprising, a socket section, an outer section pivotally connected to said socket section, locking means pivotally supported by said socket section, and resilient means indirectly connected to said locking means and directly connected to said outer section for applying wiping pressure to said arm and maintaining the locking means in an operative position.

2. A windshield wiper arm comprising, a socket section, an outer section pivotally connected to said socket section, a latch member pivotally supported by said socket section, and resilient means indirectly connected to said latch member and directly connected to said outer section for applying wiping pressure to said arm and maintaining the latch member in an operative position.

3. A windshield wiper arm comprising, a socket section, an outer section pivotally connected to said socket section, a latch member pivotally supported by said socket section, said latch member being formed with bearing means, a lug movably supported in said bearing means, and resilient means interconneccting said lug and said outer section for applying wiping pressure to said arm and maintaining the latch member in an operative position.

4. A windshield wiper arm comprising, a socket section, an outer section pivotally connected to said socket section, a latch member of channel shape configuration pivotally supported by said socket section and having slotted sidewalls, a lug member having a pair of transversely extending ears mounted within the slots of said sidewalls for pivotal movement, and resilient means interconnecting said lug member and said outer section for applying wiping pressure to said arm and maintaining the latch member in an operative position.

5. A windshield wiper arm comprising, a socket section, an outer section pivotally connected to said socket section, a latch member pivotally supported by said socket section, a lug member movably supported on said latch member, and a coil spring, opposite ends of which are connected with said lug member and said outer section for applying wiping pressure to said arm and maintaining the latch member in an operative position.

6. A windshield wiper arm having an inner section formed with a spindle-receiving bore, an outer section pivotally connected to said inner section, locking means pivotally supported by said inner section including a tang arranged to extend beneath said spindle, and resilient means indirectly connected to said locking means and directly connected to said outer section for applying wiping pressure to said arm and maintaining the locking means in an operative position.

7. A windshield wiper arm having an inner section formed with a spindle-receiving bore, an outer section pivotally connected to said inner section, a latch member pivotally supported by said inner section having a tang arranged to extend beneath said spindle, and resilient means indirectly connected to said latch member and directly connected to said outer section for applying wiping pressure to said arm and positioning the latch member so that the tang is in an operative position.

8. A windshield wiper arm having an inner section formed with a spindle-receiving bore, an outer section pivotally connected to said inner section, a latch member pivotally supported by said inner section having a tang arranged to extend beneath said spindle, a lug pivotally supported on said latch member, and resilient means interconnecting said lug and said outer section for applying wiping pressure to said arm and maintaining the latch member in an operative position.

9. A windshield wiper arm having an inner section formed with a spindle-receiving bore, an outer section pivotally connected to said inner section, a latch member pivotally supported by said inner section having a tang arranged to extend beneath said spindle, said latch member being of channel shape and having slotted sidewalls, a lug member having means for movably supporting it in said slotted sidewalls, and resilient means operatively interconnecting the lug member and said outer section for applying wiping pressure to said arm and maintaining the latch member in an operative position.

10. A windshield wiper arm having an inner section formed with a spindle-receiving bore, an outer section pivotally connected to said inner section, a latch member pivotally supported by said inner section having a tang arranged to extend beneath said spindle, said latch member being of channel shape, a lug member pivotally supported within the sidewalls of said channel shaped latch member, and a coil spring, opposite ends of which are connected to said lug member and said outer section for applying wiping pressure to said arm and maintaining the latch member in an operative position.

References Cited in the file of this patent

UNITED STATES PATENTS

| | | |
|---|---|---|
| 2,365,251 | Curtiss | Dec. 19, 1944 |
| 2,557,755 | Nesson | June 19, 1951 |
| 2,715,729 | Anderson | Aug. 16, 1955 |